April 27, 1965  C. L. CARTWRIGHT  3,180,048
DETACHABLE THUMB REST FOR FISHING REELS
Filed July 25, 1963
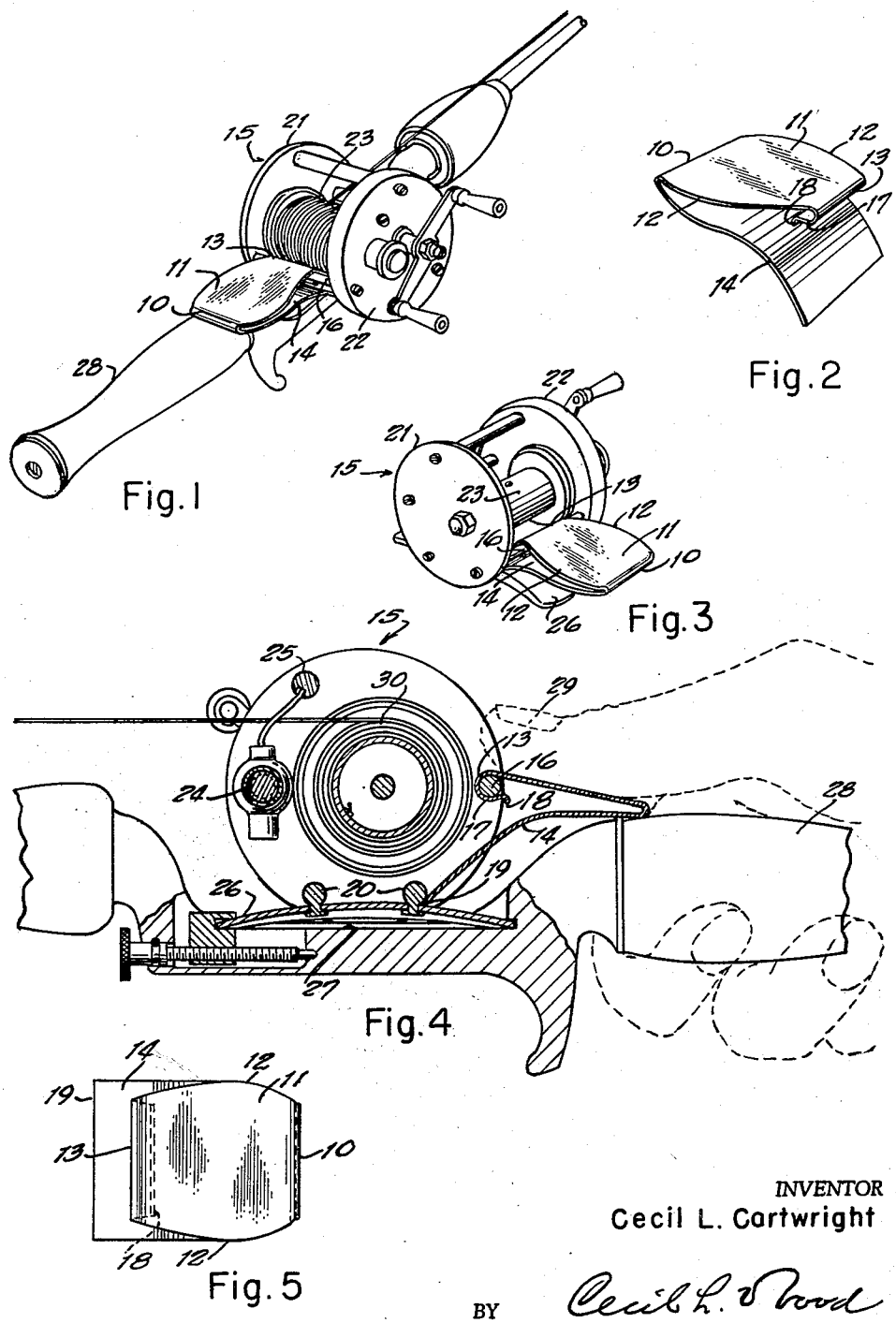
INVENTOR
Cecil L. Cartwright
BY *Cecil L. Hood*
ATTORNEY

3,180,048
DETACHABLE THUMB REST FOR FISHING REELS
Cecil L. Cartwright, Dallas, Tex., assignor of fifty percent to William S. Carter, Dallas, Tex.
Filed July 25, 1963, Ser. No. 297,584
3 Claims. (Cl. 43—25)

This invention relates to fishing reels, or the type of reels used in casting lures and artificial bait, and it has particular reference to a detachable thumb rest capable of being detachably secured to substantially all conventional type reels.

The principal object of the invention resides in the provision of a simple and economical attachment for fishing reels which is arranged adjacent to the rod handle, and secured to existing parts of the reel to afford a convenient thumb rest while casting and thus provide for better grip and balance during the casting movements, and minimizing hand fatigue.

Other devices have been designed for a similar purpose, but such devices are generally of the type which necessitates permanent attachment to the rod handle, or to the reel, and installation is made when these articles are manufactured and would be impractical as an attachment for an already existing rod or reel unit. The device embodying the invention is capable of being readily and easily snapped into position on conventional equipment, or removed therefrom as desired, with a minimum of effort.

A further object of the invention is that of providing a thumb rest which is capable of application to existing reels of conventional open face type without the aid of tools, either while the reel is installed on the reel seat, or apart therefrom, and so designed as to provide maximum comfort and control and thus improve the accuracy of casting operations.

Broadly, the invention contemplates the provision of a detachable thumb rest which is light in weight, decorative in appearance, and inexpensive, affording an accessory for rod and reel combinations by which such devices can be improved with little effort and expense.

While the foregoing objects are paramount, other and lesser objects will become apparent as the description proceeds, when considered in connection with the appended drawings wherein:

FIGURE 1 is a perspective illustration of a conventional fishing reel attached to a rod, and showing the invention installed on the reel.

FIGURE 2 is a perspective illustration of the invention.

FIGURE 3 is a perspective illustration of a fishing reel, detached from a rod, and showing the invention attached thereto.

FIGURE 4 is a cross-sectional view of a conventional fishing reel showing the invention attached thereto, the latter being shown in longitudinal section with the reel seat, and illustrating, in dotted lines, the manner in which the invention is used, and FIGURE 5 is a top plan view of the invention.

Accordingly, the invention, in its preferred embodiment, is formed of a single strip of relatively thin metal, such as stainless steel, and folded at 10 to provide a flat thumb engaging surface or table 11 which may have its opposing edges 12 curved outwardly so that the forward end 13 is narrower than the downward and inwardly curved supporting element 14, as shown particularly in FIGURE 5.

The invention is adapted to be attached to the reel 15, which is of conventional design, by applying the rolled forward end 13 to a cross bar 16 of the reel 15, as shown in FIGURES 1, 3 and 4. The end 13 of the thumb engaging table 11 is turned downwardly and inwardly to define a hook 17 having a diameter substantially that of the bar 16, which is round in transverse section.

The extreme inner end 18 of the member 11 is turned outwardly as shown in FIGURES 2 and 4, to expedite the attachment of the device to the reel 15. By this arrangement the invention can be readily snapped into position on the bar 16 while the end 19 of the supporting element or leg 14 engages the rearmost mounting bar 20 of the reel 15, as shown particularly in FIGURE 4.

The conventional open face reel 15 comprises a pair of discular members 21 and 22 having the spool 23 pivotally supported therebetween. The members 21 and 22 are secured in spaced relation by the bar 16, the mounting bars 20, the level-wind bar 24, and the level-wind guide bar 25. The mounting bars 20 are secured transversely of a base member 26 by which the reel is detachably secured to its seat 27 on the rod handle 28.

An important feature of the invention resides in its flexibility. The supporting member or leg 14 is curved upwardly along its longitudinal axis so that when its outer end 19 is seated against the rearmost mounting bar 20 of the reel 15, as illustrated in section in FIGURE 4, the member 14 will flex upwardly to afford yieldability to the thumb engaging element 13 as pressure is applied, as indicated in FIGURE 4. The arrangement will enable the operator to easily move his thumb 29, shown in dotted lines in FIGURE 4, forwardly to engage the spooled line 30 for proper tension thereon.

The invention can be removed from the reel 15 by raising the member 13 and urging it forwardly to disengage it from the bar 16.

The invention is simple in structure and design and is capable of being modified in form without departing from the spirit and intent thereof or the scope of the appended claims.

What is claimed is:

1. A detachable thumb rest for fishing reels having a mounting base, a mounting bar transversely of said base and a horizontal cross bar rearwardly of the axis of said reel above said base comprising, a flexible sheet metal strip having a transverse acute bend spaced from one end defining a planar portion providing a thumb engaging surface adjacent the reel and a longer supporting portion, the terminal of said one end being rolled downwardly and inwardly forming a clip for detachably embracing said horizontal cross bar of said reel, the said supporting portion being longer and curved inwardly and downwardly from said bend toward the opposite end of said strip and abutting said mounting bar to yieldably support said planar portion when engaged by the thumb.

2. In combination with an open type fishing reel having a spool, a mounting base, a mounting bar transversely of said base, and a parallel spacing bar rearwardly of said spool above said base, a thumb rest, comprising, a flexible sheet metal strip acutely bent transversely defining divergent portions, one portion being planar and having its free end rolled inwardly toward the opposite portion forming a hook for embracing said parallel spacing bar on said reel, said opposite portion being curved longitudinally away from said planar portion and abutting said mounting bar providing a semi-rigid support for said planar portion when engaged by the thumb.

3. In combination with an open type fishing reel having a spool, a mounting base, a mounting bar transversely of said base, and a spacing bar rearwardly of said spool and above said base, a thumb rest for said reel comprising, a semi-flexible sheet metal strip having an acute transverse bend spaced from one end defining diverging portions, the shorter of said portions being planar and the longer opposite portion being curved longitudinally away from said shorter portion toward the opposite end of said strip, the terminal of said one end of said strip and said shorter portion being rolled inwardly toward said opposite curved portion and upwardly to form a hook for embracing said spacing bar on said reel, and the said longer opposite portion providing a semi-rigid support for said planar portion when the opposite end of said strip and said longer curved portion is abutted against said mounting bar.

References Cited by the Examiner
UNITED STATES PATENTS

| 177,544 | 5/76 | Noe | 242—84.53 |
| 1,916,924 | 7/33 | Foss | 43—23 |

ABRAHAM G. STONE, *Primary Examiner.*